United States Patent

Outzen

[11] Patent Number: 5,957,671
[45] Date of Patent: Sep. 28, 1999

[54] REFRIGERANT COMPRESSOR WITH AN ELECTRIC MOTOR HAVING AN INSULATION FILM

[75] Inventor: Svend Erik Outzen, Sønderborg, Germany

[73] Assignee: Danfoss Compressors GmbH, Flensburg, Germany

[21] Appl. No.: 08/945,814

[22] PCT Filed: May 2, 1996

[86] PCT No.: PCT/DK96/00202

§ 371 Date: Oct. 27, 1997

§ 102(e) Date: Oct. 27, 1997

[87] PCT Pub. No.: WO96/35875

PCT Pub. Date: Nov. 14, 1996

[30] Foreign Application Priority Data

May 8, 1995 [DE] Germany ............... 195 16 811

[51] Int. Cl.⁶ .................................. F04B 35/04
[52] U.S. Cl. .............. 417/410.1; 417/415; 417/902
[58] Field of Search ............... 417/410.1, 902, 417/415; 62/498

[56] References Cited

U.S. PATENT DOCUMENTS 3,306,524  2/1967  Matuki et al. ............... 230/58
4,725,334  2/1988  Brimm ..................... 156/630

*Primary Examiner*—Charles G. Freay
*Attorney, Agent, or Firm*—Lee, Mann, Smith, McWilliams, Sweeney & Ohlson

[57] ABSTRACT

A refrigerant compressor is disclosed, having an electric motor, the stator of which has windings with winding heads and the rotor of which drives a compressor which comprises a compressor lock having an axially projecting bearing part for a rotor shaft, one winding head extending in the direction of the compressor block and electrical insulation being provided between the winding head and the compressor block. With the same overall size, it is desirable to be able to improve the efficiency of such a refrigerant compressor without markedly increasing the effort involved in assembly. To that end, the insulation is formed by a film which is pushed with a substantially centrally arranged opening onto the bearing part.

8 Claims, 2 Drawing Sheets

REFRIGERANT COMPRESSOR WITH AN ELECTRIC MOTOR HAVING AN INSULATION FILM

BACKGROUND OF THE INVENTION

The invention relates to a refrigerant compressor, having an electric motor, the stator of which has windings with winding heads and the rotor of which drives a compressor which comprises a compressor block having an axially projecting bearing part for a rotor shaft, one winding head extending in the direction of the compressor block and electrical insulation being provided between the winding head and the compressor block.

Such refrigerant compressors are widely used in domestic refrigerators, that is, in refrigerators or freezers. In these cases, one would like to have as much space as possible for the cooling chamber, which requires the refrigerant compressor to be made as small as possible.

Refrigerant compressors have therefore already become known, (U.S. Pat. Ser. No. 3,306,524) the diameter of which is determined essentially only by the diameter of the motor and the height of which is determined by the sum of the heights of motor and compressor. The electrical insulation in that case is provided by a shell, which is secured to the winding head of the stator winding that is next to the compressor block. Securing this shell to the winding head is difficult, however. During assembly, there is a danger that the shell will be pushed out of its desired position. Moreover, the shell covers only a small part of the winding head, so that electrical safety can be guaranteed only if there is an adequate distance between the uncovered parts of the winding head and the compressor block.

The reduction in the overall size of such refrigerant compressors leads to a reduction in efficiency. A prime cause of this reduction in efficiency is attributable to electric losses in the motor.

The problem on which the invention is based is to be able to improve the efficiency of the refrigerant compressor with the same overall size, without substantially increasing the work involved in assembly.

SUMMARY OF THE INVENTION

That problem is solved in a refrigerant compressor of the kind mentioned in the introduction in that the insulation is formed by a film which is pushed with a substantially centrally arranged opening onto the bearing part.

The film is, of course, electrically insulating. Because it is used in an encapsulated refrigerant compressor, it must also be resistant to the refrigerant used therein. The film is pushed onto the bearing part and thereby fixed to the compressor block. It covers over the compressor block so that the winding head can now be relatively generously enlarged without the risk of electrical contact between the winding head and the compressor block. By enlarging the winding head, electric losses can be reduced and thus efficiency increased. The work involved in assembly is only slightly increased. As an additional step the foil has to be pushed onto the bearing part. The refrigerant compressor can then be assembled in the customary manner. No heed need be paid, however, to ensuring that the winding head of the stator winding maintains a certain distance from the compressor block.

This again simplifies assembly, because the stator can be secured to the compressor block without more specific spacing requirements. The film does not have a distinct three-dimensional shape. On the contrary, it adapts itself to the winding head so that even with a simple construction a relatively safe electrical insulation is achieved.

The film preferably lies under a predetermined pre-stress against the circumference of the bearing part. By being pushed onto the bearing part it is, as it were, fixed to the compressor block. This facilitates further assembly. Moreover, in operation this prestress also guards against the film coming loose from its given position and leading to unpredictable electrical states in operation.

The film preferably consists of a flexible material having a predetermined stiffness. It thus adapts itself extremely well to the winding head. Moreover, only negligible forces are required to push it onto the bearing part. In its installed and deformed state, the film tends to resume its flat form. That gives rise to a certain tension.

The film is preferably substantially rectangular, in particular, square. It therefore matches the stator of the motor which generally has the same basic shape; the corners of this rectangle or square are used for the fixing operation. Because the film is of a corresponding shape, electrical insulation is ensured virtually over the entire cross-sectional area.

In that case it is especially preferred for the film to be bounded by edges curving inwardly in an arcuate manner. These arcuate edges produce tongue-like corners which extend into the corresponding corners of the stator, bend downwards and rest against the supporting legs of the compressor block, where fixing is also effected. Between them these arcuate edges ensure, however, that an opening is kept clear between the supporting legs of the compressor block, even when the film hangs down over the winding head, so that satisfactory permeation by refrigerant gas, and thus cooling of the motor, is ensured.

In a preferred construction, on its outside the bearing part has reinforcing ribs running substantially axially and cut-outs corresponding to the opening. The film is therefore able to fit substantially closely around the bearing part even where reinforcing ribs occur. This firstly increases the retaining force and secondly improves the electrical insulation.

The bearing part is preferably conical. The retaining force is then increased as the film is pushed on further.

It is also preferred for the film to lie against supporting legs of the compressor block. The construction can even be chosen so that in this region the film is secured, that is, clamped in, between the supporting legs and the stator. Insulation with respect to the supporting legs is therefore also ensured.

BRIEF DESCRIPTION OF THE DRAWINGS

The invention is described hereinafter with reference to a preferred embodiment of the invention in conjunction with the drawings, in which.

DESCRIPTION OF AN EXAMPLE EMBODYING THE BEST MODE OF THE INVENTION

Figure 1:
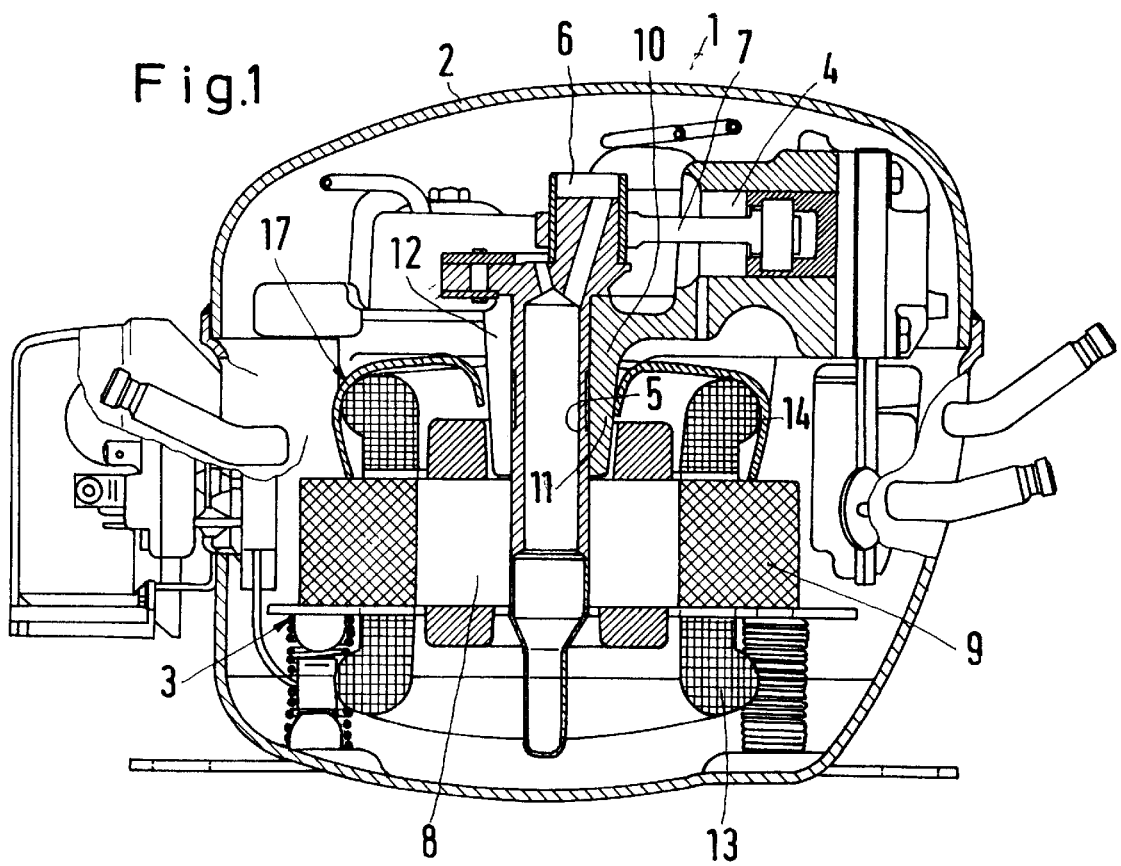
FIG. 1 is a diagrammatic cross-section through a refrigerant compressor.
Figure 2:
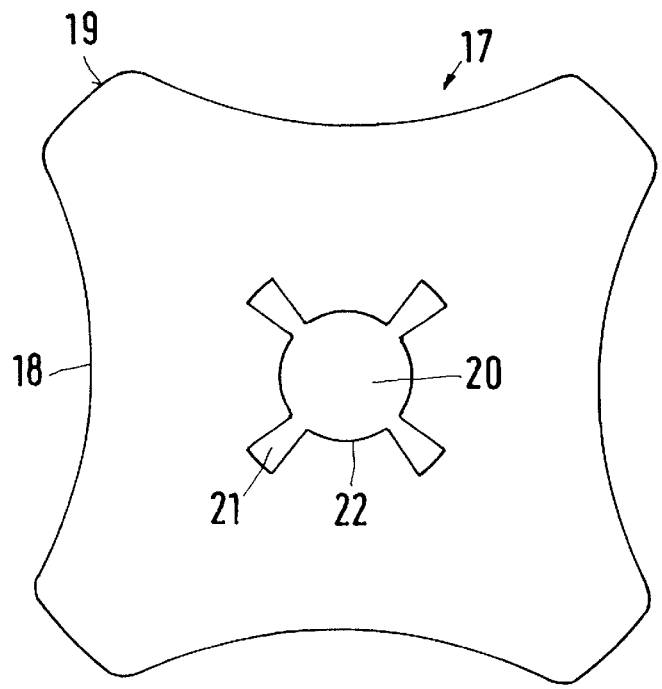
FIG. 2 is a plan view of a film.
Figure 3:
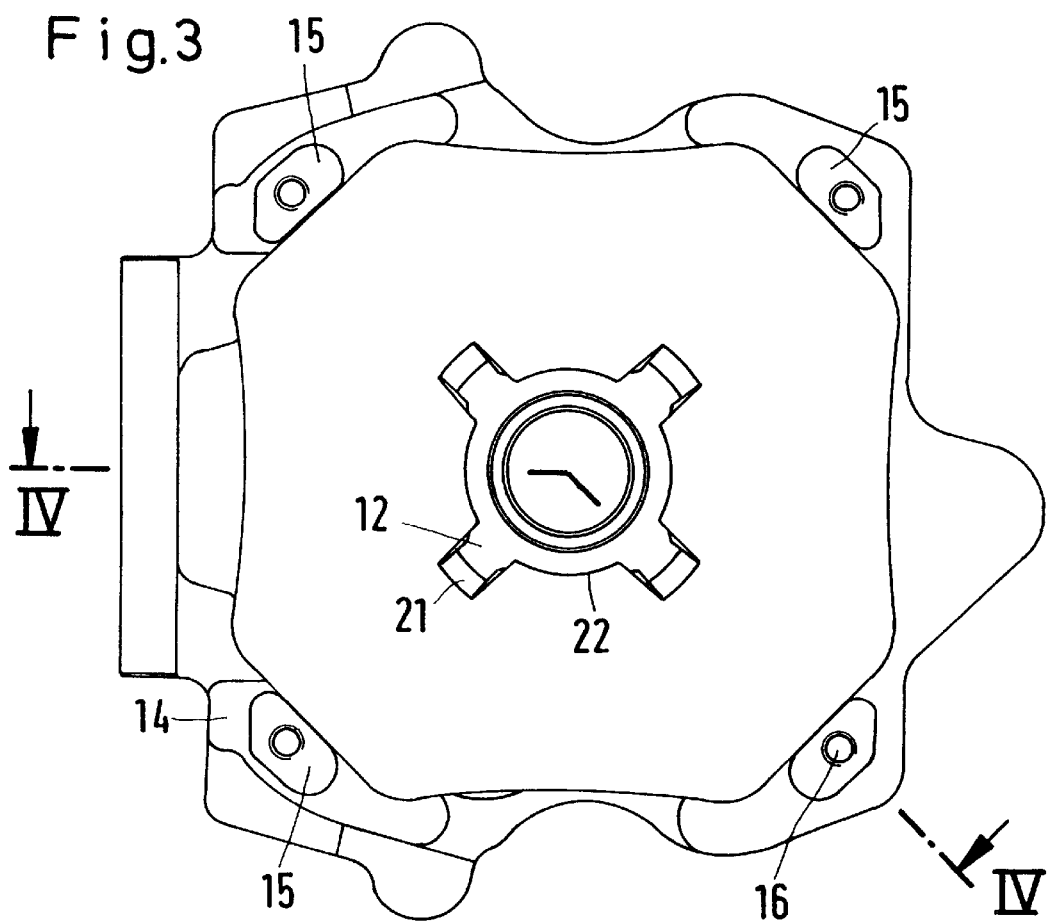
FIG. 3 is a plan view of a compressor block, viewed from the motor.

A refrigerant compressor 1 has an electric motor 3 and a compressor 4 in a hermetically encapsulated housing 2.

Motor 3 and compressor 4 are joined to one another by way of a common shaft 5, the shaft having at its compressor-side end a crank 6 by means of which in known manner a drive shaft 7 of the compressor 4 is driven. The shaft 5 is driven by the rotor 8 of the motor, which rotor is able to rotate inside the stator 9 of the motor 3.

The shaft 5 is mounted in a compressor block 10, which for that purpose has a bearing part 11. The bearing part 11 projects axially in the direction of the motor 3. It has reinforcing ribs 12 which are uniformly distributed in the circumferential direction and are arranged lying diametrically opposite one another.

The stator 9 has a stator winding with winding heads 13, 14, the winding head 14 being arranged adjacent to the compressor block 10.

Figure 4:
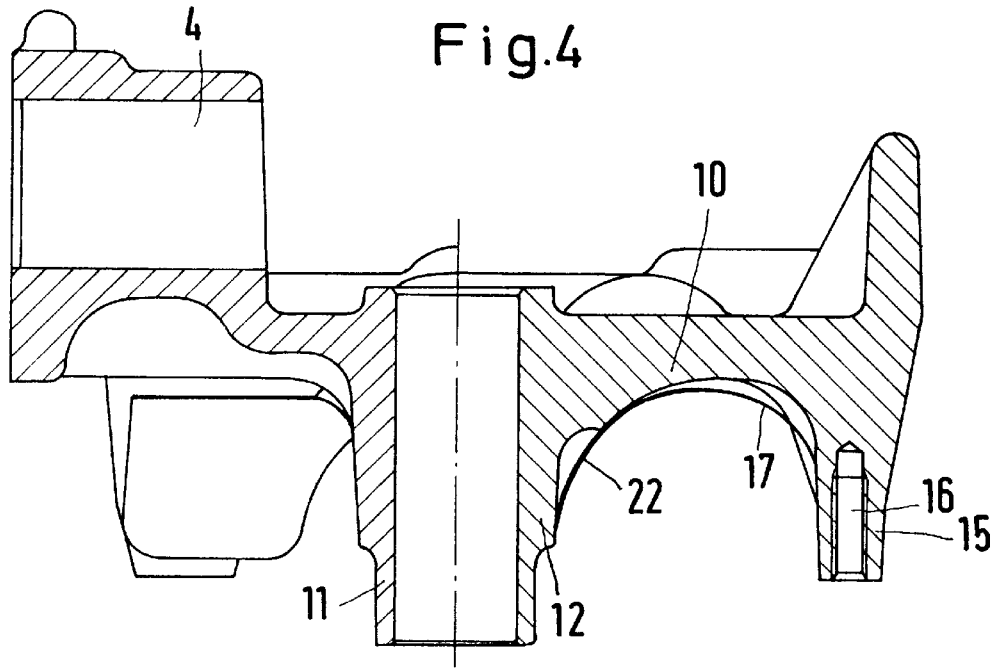
FIG. 4 is a section IV-IV according to FIG. 3.

The compressor block 10 has supporting legs 15, clearly recognisable in FIG. 4, by means of which it can be secured to the stator 9, for example, using screws, which can be screwed into threaded bores 16 provided for that purpose.

The construction of such refrigerant compressors 1 is known per se. Further technicalities, such as refrigerant inlets and outlets or electrical connections are therefore not dealt with in detail.

Between the winding head 14 and the compressor block 10 there is arranged a film 17, which has electrically insulating properties and is resistant to the refrigerant found in the housing 2.

The film 17 has a substantially square form. The sides 18 of the square are, however, curved inwardly in an arcuate manner and thus form tongue-like corners 19. In the middle of the film 17 there is provided a substantially circular opening 20. The opening 20 is supplemented by cut-outs 21, which are matched in number and size to the reinforcing ribs 12. The film 17 consists of a flexible material having a certain stiffness or resilience, that is, it can be deformed without difficulty, but tends to spring back and assume its original flat shape again. It is pushed with its opening 20 onto the bearing part 11. With the portions 22 remaining between the cut-outs 21 it therefore positions itself under a certain pre-stress against the bearing part 11. Since the bearing part 11 has a conical shape with a relatively gentle taper, it is relatively simple to thread on the film 17. As the film 17 is pushed further onto the bearing part 11, the retaining force increases. As the film is being pushed onto the bearing part 11, the portions 22 remaining between the cut-outs 21 bend away from the compressor block. The reinforcing ribs 12 engage the cut-outs, whereby the film 17 arches out slightly and the tongue-shaped corners 19 lie against the supporting legs 15 of the compressor block 10. The arcuate side edges 18 of the otherwise approximately square film 17 also contribute to this arching-out.

To assemble the refrigerant compressor 1, first of all the film 17 is pushed onto the bearing part 11 of the compressor block 10. Since the reinforcing ribs 12 have a fixed orientation with respect to the supporting legs 15, the cut-outs 21 automatically align the film 17 correctly such that the corners 19 are next to the supporting legs 15. The film 17 is then pressed as far as possible onto the compressor block 10 and then stays fixed by virtue of its inherent tension. Fitting on the film 17 increases the time taken for assembly time only very negligibly. The electric motor 3 can then be installed, the installation optionally taking place in two steps, to be precise, first of all the stator 9 and then the rotor 8, or vice versa. The film 17 presents no further obstacle, especially if during assembly the compressor 4 is arranged beneath the motor 3. No special care need be taken to ensure that the winding head 14 keeps a minimum distance away from the compressor block 10. The electrical insulation is provided exclusively by the film 17. The winding head 14 can thus be pressed right up to the compressor block 10. The foil adapts itself to the shape of the winding head 14. Even small changes in the shape of the winding head 14, which can arise through the mechanical forces caused during installation, are unimportant, because the film 17 is able to accommodate these changes. Because the film 17 rests against the supporting legs 15 during assembly, the film automatically assumes the form illustrated in FIG. 1 in cross-section. It is maintained even when the motor-compressor unit 3, 4 is turned round, so that the compressor 4 comes to lie on top.

I claim:

1. Refrigerant compressor having an electric motor with a rotor and a stator, the stator having windings with winding heads and the rotor driving a compressor which comprises a compressor block having an axially projecting bearing part for a rotor shaft, one winding head extending toward the compressor block and electrical insulation being provided between the winding head and the compressor block, the insulation being a film with a substantially centrally arranged opening, said opening engaging said bearing part.

2. Compressor according to claim 1, in which the film engages the circumference of the bearing part with a pre-determined stress.

3. Compressor according to claim 1, in which the film comprises a flexible material having a predetermined stiffness.

4. Compressor according to claim 1, in which the film is substantially rectangular.

5. Compressor according to claim 4, in which the film is bounded by edges curving inwardly in an arcuate manner.

6. Compressor according to claim 1 in which the bearing part has reinforcing ribs on an outside surface running substantially axially and the opening of the film has corresponding cutouts.

7. Compressor according to claim 6, in which the bearing part is conical.

8. Compressor according to claim 1, in which the film bears against supporting legs of the compressor block.

* * * * *